US006242033B1

(12) United States Patent
Sander

(10) Patent No.: US 6,242,033 B1
(45) Date of Patent: Jun. 5, 2001

(54) HIGH PROTEIN CEREAL

(76) Inventor: Eugene H. Sander, Rte. 1, Box 83, Hayfield, MN (US) 55940

( * ) Notice: Subject to any disclaimer, the term of this patent is extended or adjusted under 35 U.S.C. 154(b) by 0 days.

(21) Appl. No.: 09/251,131

(22) Filed: Feb. 16, 1999

(51) Int. Cl.$^7$ ................................................. A23L 1/18
(52) U.S. Cl. ......................... 426/559; 426/619; 426/621; 426/440; 426/446; 426/448; 426/449; 426/458
(58) Field of Search .................................. 426/549, 559, 426/619, 621, 440, 446, 448, 449, 458

(56) References Cited

U.S. PATENT DOCUMENTS

| | | | |
|---|---|---|---|
| 3,637,400 | 1/1972 | Mullen et al. | 99/83 |
| 3,764,715 | 10/1973 | Henthorn et al. | 426/273 |
| 3,873,748 | * 3/1975 | Schwab et al. | 426/346 |
| 3,911,142 | 10/1975 | Huelskamp et al. | 426/559 |
| 3,950,543 | 4/1976 | Buffa et al. | 426/18 |
| 4,044,159 | 8/1977 | Lutz | 426/302 |
| 4,097,613 | 6/1978 | DeLauder et al. | 426/303 |
| 4,128,372 | 12/1978 | Rose et al. | 425/311 |
| 4,497,840 | * 2/1985 | Gould et al. | 426/560 |
| 4,748,027 | * 5/1988 | Schou et al. | 426/96 |
| 4,755,390 | 7/1988 | Calandro et al. | 426/293 |
| 4,790,996 | 12/1988 | Roush et al. | 426/458 |
| 4,834,989 | * 5/1989 | Bolles et al. | 426/28 |
| 4,873,110 | 10/1989 | Short et al. | 426/621 |
| 5,024,996 | 6/1991 | Ringe | 514/54 |
| 5,026,689 | 6/1991 | Ringe et al. | 514/57 |
| 5,132,133 | 7/1992 | Huber et al. | 426/241 |
| 5,362,511 | 11/1994 | Villagran et al. | 426/549 |
| 5,395,623 | * 3/1995 | Kovach | 426/28 |
| 5,603,975 | 2/1997 | Fontana | 426/506 |
| 5,888,564 | * 3/1999 | Fontana | 426/94 |

FOREIGN PATENT DOCUMENTS 804923   11/1958   (GB) .

* cited by examiner

*Primary Examiner*—Nina Bhat
(74) *Attorney, Agent, or Firm*—Kinney & Lange, P.A.

(57) ABSTRACT

The present invention includes an expanded cereal-type product and a method for making such a product wherein the cereal-type product has a high protein content. A starch derived from a tuber is used to aid in expanding the extrudate to form cereal-type pieces. The amount of denatured protein relative to functional protein is adjusted to obtain selected textured characteristics.

23 Claims, No Drawings

HIGH PROTEIN CEREAL

BACKGROUND OF THE INVENTION

The present invention relates to a high protein food product and a method of making a high protein food product.

Traditional high protein food sources such as meat, dairy products, legumes and the like have been used by nutritionists to establish consumption levels needed to meet the minimum daily requirements (MDR) for protein in varied diets for adults and children. However, changing work and health patterns of consumers have brought on either the need to lose weight or to gain weight by managing diet through appropriate nutritional intake.

There has been a focus on the need for more exercise for a population that is increasingly latent and the importance of exercise for good health has spawned an increase in interest in sports nutrition as a way to manage body health. Managing body health through appropriate nutritional intake and exercise is accomplished by selective intake of metabolites such as protein, fat, carbohydrates, vitamins and minerals so that goals such as sustained energy availability for intense performance (such as running) or for maximizing muscle mass in bodybuilding goals are achieved.

Maximizing protein intake has been an accepted way for maximizing muscle mass in bodybuilding. A market has been established for products which maximize protein content while minimizing other essential metabolites without putting body health at risk. Products presently on the market include formulated high protein drinks (powdered or a liquid) that are tailored nutritionally for the bodybuilding market. A need for concentrated sources of protein in a convenient form has expanded beyond bodybuilding and other markets have emerged. The expanded interest comes from participants in other sports, children and senior citizens looking for quick energy fixes and sustained muscle builders and muscle repairs.

High protein drink delivery systems have their drawbacks. One is the monotony of consuming a liquid, meal after meal, day after day. In addition, the high protein drink delivery systems on the market today are costly. What is needed is an alternative for delivering a high protein food source that either replaces or supplements the present high protein drink delivery systems.

It has been known to use breakfast cereals as a vehicle to deliver more protein. For example, the Schwab U.S. Pat. No. 3,873,748 describes a method to make a high protein (up to 25%) ready to eat flake breakfast cereal by cooking, extruding, drying and grinding a basic cereal matrix and then blending the resulting product with sodium caseinate, rewetting the mixture and extruding to form pellets, and finally using high pressure rolls to create the flakes.

The Malzahan U.S. Pat. No. 3,852,491 describes the use of high temperature/high pressure (HTHP) extrusion to produce an expanded cereal containing up to 55% protein. Soy protein isolate having up to 90% protein was processed at temperatures in a range of 220° to 355° F. and at pressures in the range from 1000 to 3000 psig. However, it was noted that as the temperature of the extruded dough mass reached 355° F. or higher, a stringy protein fiber-like texture developed. A more cereal-like texture was observed at lower temperatures.

Sander, Bennett and Austin also proposed the use of recently developed twin screw extrusion to prepare breakfast cereals and snacks containing up to 50% protein by combining a farinaceous source such as rice flour with a concentrated protein source such as soy protein isolate (90% protein). *Fabrication of Low Moisture, High Protein Foods Using Soy Isolates and HTST Twin Screw Extrusion*, Chemistry of Foods and Beverages, Academic Press, Inc. (1982) p. 251.

HTHP extrusion has received much attention as a means of physically changing vegetable proteins particularly soy into textured particulates which when rehydrated with water resemble ground beef. Numerous patents have been issued covering such technology to produce meat analogs. This technology has been commercialized, and textured soy proteins are commonly used for ground beef extenders and in such products as meatless vegetarian burgers.

BRIEF SUMMARY OF THE INVENTION

The present invention includes an expanded cereal-type product and a method for making such a product wherein the cereal-type product has a high protein content. A starch derived from a tuber is used to aid in expanding the extrudate. In addition, denatured protein is used to aid in producing a high protein cereal-type product having mouth feel characteristics of a typical low protein expanded cereal.

DETAILED DESCRIPTION

The present invention includes an expanded cereal product having a high protein content. Utilizing the process of the present invention, an expanded cereal-type product is made having a protein content of at least 50% and even up to 70%. Except where otherwise noted, all percentages recited herein are by weight.

It has been surprisingly found that the use of a tuber starch provides sufficient expanding capabilities to a high protein blend process through HTHP extrusion such that a cereal-type product having a loose pack bulk density similar to popular cereal products presently in the marketplace, such as CHEERIOS (General Mills, Inc. of Minneapolis, Minn.), is produced. By loose pack bulk density is meant the density of cereal pieces that when placed in the container would flow freely from a container when the container is tipped. A suitable range of loose pack bulk densities for use in the present invention is 0.13–0.38 gms/cc.

For purposes of the present invention, high protein means a cereal having a minimum of 20% protein and preferably 50% or greater. Exemplary protein sources include but are not limited to soy protein concentrate and isolate, pea protein, corn protein (zein), rice protein or dairy proteins such as lactalbumin, casein, whey solids, whey protein concentrates and isolates, non-fat dry milk, or protein from any recognized cereal sources as well as mixtures thereof. It has been surprisingly found that the use of denatured protein concentrates provides a product having mouth feel characteristics similar to a low protein expanded cereal. Through manipulation of relative amounts of functional protein and denatured protein cereal texture characteristics of a low protein expanded cereal can be achieved. Functional protein is protein whose naturally occurring properties and characteristics are not substantially changed during purification processing. By denatured is meant that the molecular structure of the protein is modified or changed by heat treatment or chemical treatment such as by an acid or alkali or by ultraviolet light to change the appearance or change some of the original properties such that performance (gelling ability dispersability, or biological activity) of the treated protein is changed or modified.

The expanded cereal-type product is produced through the use of high temperature high pressure (HTHP) extrusion.

Such extrusion is well known in the art, and is described in the following U.S. Pat. No. 4,790,996, which is incorporated herein by reference.

The starch derived from a tuber supports expansion of the cereal product exiting the die such that the extruded expanded product resembles a typical expanded cereal product. Exemplary starches include starches derived from potatoes (*Solanum tuberosum*), sweet potatoes (*ipomoea batatas*), cassava (*manihot esculenta*), edible canna (*canna edulis*), dasheen (*Colocasia esculenta*), tanier (Xanthosoma sps.), taro (*Colocasia esculenta*), yam (Dioscorea spp.), and Jerusalem artichoke (*helianthus tuberosus*). Especially suitable for the present invention is starch derived from the cassava plant which is commonly referred to as tapioca or starch derived from potatoes.

Other texturizing shaping carbohydrate sources not derived from tubers may also be used in the present invention to supplement the tuber starch. Such starches include flours derived from rice, oats, corn barley, and buckwheat.

Other nutritive additives that can be added to the present invention include betaglucans from oats, isoflavones, soy beans, inulin and fructooliogosaccharides (FOS), and dietary fibers. Other nutritional, health, or sports oriented additives may be added to the present invention not only in the base mixture used to produce the cereal-type product but also after formation of the cereal-type product through the use of liquid sprays. Such ingredients include various vitamins and minerals that may be heat sensitive and unable to withstand extrusion temperatures and pressures. Liquid sprays or liquid sprays together with subsequent dry enrobing of other particulates to a wet sticky surface can also be used to convey other nutritive additives such as soluble carbohydrates, cell promoters, or metabolic promoters such as L-creatine.

The following examples are included to illustrate the present invention and are not intended to limit the present invention in any way.

EXAMPLE 1

A dry blend of 50% rice flour and 50% soy protein isolate (90% protein) targeting a protein content of 50% in the final product was fed along with ambient tap water into a Baker Perkins Model MFF 50D 25 twin screw extruder with an L/D ratio of 15:1. Water was introduced into the extruder at 275 cc/min. generating a moisture content of 18% in the feed stream to and within the mixing section of the extruder.

Extruder operating conditions were adjusted to produce an expanded product in the shape of an "O". At steady state, the extruder operations were as follows:

| | |
|---|---|
| Moisture feed rate | 0.61 lbs./min. |
| Dry blend feed rate | 3.4 lbs/min. |
| Moisture content of blend | 18% |
| Extruder screw speed | 400 rpms |
| Extruder screw motor torque | 60–65% |
| Extrudate barrel temperature | 240–250° F. |
| Pressure at die | 150–160 psig |
| Speed of extrudate cutter | 1100–1500 rpms |
| Extrudate output | 185 lbs./hr. |

Extruded pieces were dried to a final moisture content of 5.3% in a batch forced air convection oven.

The product was lightly colored with a glassy appearance. The texture of the finished product when finally dried to a moisture content of approximately 5.3% was judged quite brittle and tended to shatter into flakes when masticated in the mouth. The product was also judged unpalatable having too bland of a flavor and was too brittle to survive conventional post extrusion cereal handling including continuous drying and coating steps.

The final product after drying had a loose pack bulk density of approximately 0.20 gms/cc and a protein dispersability index (PDI) of 31.48. The flour/protein isolate blend feed had a protein dispersability index of 83.65 (the sole source of the protein being a highly functional soy protein isolate). The final product had a protein content by analysis of 48%.

EXAMPLE 2

A dry blend consisting of 23% rice flour, 32% soy protein isolate and 45% of SOYFUL™ III, a denatured soy protein concentrate (PDI=5.6) obtained from Zumbro, Inc. of Hayfield, Minn. were blended together targeting a 50% protein content in the final product to observe the effect of denatured protein on the final product. The blend had an aggregate PDI of 41.39. The dry blend was fed along with ambient tap water into the same extruder described in Example 1. Operating conditions used in Example 2 were the same as in Example 1. The extruded pieces were dried to a final moisture content of approximately 5.3% in a batch forced convection air oven.

The resulting product was more cereal-like than the product of Example 1 with a loose pack bulk density of approximately 0.38 gm/cc and a PDI of 19.41 with a protein content by analysis of 49.7%. By more cereal-like is meant that the product in terms of color, flavor texture and integrity was more like CHEERIOS® manufactured by General Mills, Inc. of Minneapolis, Minn.

EXAMPLE 3

In this example, the protein content of the cereal product was increased substantially. A dry blend consisting of 10% rice flour and 90% soy protein isolate targeting a final product protein content of 80% was fed along with ambient tap water into the same Baker Perkins twin screw extruder used in Example 1. The operating conditions of Example 1 were repeated.

The extrudate product leaving the extruder die did not look like nor behave like the product in Example 2. The extrudate was stringy, resembling bundles of protein fibers and when cut at the die face with the high speed cutter, shredded instead of forming distinct O-shaped pieces with controlled dimensions.

EXAMPLE 4

A dry blend consisting of 25% rice flour, 25% soy protein isolate, and 50% of SOYFUL™ III soy protein concentrate targeting a final product protein content of 50% was fed along with ambient tap water into the pre-condition section of a Wenger Model TX57 extruder (L:D ratio of 13:1) (Wenger Corp. of Sabetha, Kans.). The initial blend PDI was 38.76. The moisture content of the pre-condition blend entering the extruder was 16.5%. This example was an attempt to duplicate product of Example 2 on a different extruder. The steady state operating conditions of the extruder were as follows:

| | |
|---|---|
| Moisture feed rate | 0.62 lbs/min. |
| Dry blend feed rate | 4.6 lbs./min. |
| Moisture content of blend | 16.5% |
| Extruder screw speed | 500 rpm |
| Extruder screw motor torque | 67% |
| Extrudate barrel temperature | 527° F. |
| Pressure at die | 206 psig |
| Cutter speed | 1400 rpm |
| Extrudate output | 310 lbs./hr. |
| Moisture of extrudate exiting extruder | 13.9% |

The extruded pieces were dried in a continuous forced air reel oven (Wenger Model 4800) to a final approximate moisture content of 5.3%.

The dried extruded pieces had the following final characteristics:

| | |
|---|---|
| Loose pack bulk density | 0.16 gms/cc |
| Protein content (by analysis) | 48.5% |
| Total dietary fiber (by analysis) | 8.7% |
| Moisture content (by analysis) | 3.7 |

The product of Example 4 was quite durable throughout extrusion and drying. The final texture when masticated was more like the traditional expanded CHEERIOS®. The inclusion of denatured protein (SOYFUL™ III) at a level of 50% did not impede expansion characteristics and contributed to good texture (mouth feel) characteristics. In addition, the loose pack bulk density was reduced to 0.16 gms/cc as compared to the product of Example 2 which had a loose pack bulk density of 0.38 gms/cc. It is believed that the loose pack bulk density was decreased due to different operating conditions, such as die pressure and die (extrudate) temperature, to mention just two. The final PDI was 17.84. There was a slight detectable grittiness following mastication which suggested that the level of denatured protein may have been too high and that a lower level of denatured protein might be an improvement.

EXAMPLE 5

This example substitutes a tuber starch (tapioca) for the rice starch of Example 4. A dry blend consisting of 25% tapioca starch, 25% soy protein isolate and 50% of SOYFUL™ III soy protein concentrate targeting a final product protein content of 50% was fed along with ambient tap water into the pre-condition section of the Wenger extruder used in Example 4. The initial blend PDI was 36.45. The operating conditions used in Example 4 were adjusted to produce acceptable extrudate flow through the extruder and to optimize expansion at the die.

As indicated in the Table below, the moisture of the blend feed was increased from 16.5 to 17.8%. The extruder screw speed was reduced from 500 to 400 rpms and the barrel temperature was decreased from 527° F. to 342° F. The pressure at the die increased from 206 to 291 psig while the extrudate output increased from 310 to 337 lbs/hr. The extrudate moisture dropped from 13.9% to 10.9%.

| Changes in Processing Conditions Between Examples 4 and 5 | | |
|---|---|---|
| Process Variables | Example 4 | Example 5 |
| Moisture Feed Rate (lbs/min) | 0.62 | 0.64 |
| Dry Blend Feed Rate (lbs/min) | 4.6 | 4.7 |
| Moisture Content of Blend (%) | 16.5 | 17.8 |
| Extruder Screw Speed (rpm) | 500 | 400 |
| Extruder Screw Motor Torque (%) | 67 | 64 |
| Extruder Barrel Temperature (° F.) | 527 | 342 |
| Pressure at Die (psig) | 206 | 291 |
| Cutier Speed (rpm) | 1400 | 1571 |
| Extrudate Output (lbs/hr) | 310 | 337 |
| Moisture of Extrudate Existing Extruder (%) | 13.9 | 10.9 |

The bulk density of the cereal product was 0.14 gms/cc which was approximately the bulk density of the cereal product of Example 4 (0.16 gms/cc) made with rice flour. The final product PDI was 17.00 and had a protein content of 48.4% by analysis. The appearance of the product of Example 5 was a smoother and more uniform surface with less pockmarks. The flavor of the cereal of Example 4 was more bland, and the texture/mouth feel of product of this example was closer to the mouth feel of CHEERIOS® than the cereal product of Example 4. The result was unexpected and suggested that tapioca starch would be an excellent source of carbohydrate that is required for expansion and for simultaneous development of cereal-like (CHEERIOS®) physical characteristics in the final cereal piece.

EXAMPLE 6

Example 6 attempted to increase the protein content to 60%. A dry blend consisting of 25% tapioca starch, 50% soy protein isolate and 25% of SOYFUL III soy protein concentrate targeting a final product protein content of 60% was fed along with ambient tap water to the pre-conditioning section of the Wenger Model extruder described in Example 4. The PDI of the initial blend was 68.85. The steady state operating conditions of the extruder were as follows:

| | |
|---|---|
| Moisture feed rate | 0.66 lbs./min. |
| Dry blend feed rate | 6.4 lbs./min. |
| Moisture content of blend | 14.8% |
| Extruder screw speed | 496 rpm |
| Extruder screw motor torque | 54% |
| Extrudate barrel temperature | 323° F. |
| Pressure at die | 784 psig |
| Cutter speed | 2934 rpm |
| Extrudate output | 440 lbs./hr. |
| Moisture of extrudate exiting extruder | 13.9% |

The extruded pieces were dried in the same Wenger continuous forced air, reel oven described in Example 4 to a final moisture content of 6.6%.

The dried extruded pieces had the following chemical and physical characteristics:

| | |
|---|---|
| Loose pack bulk density | 0.13 gms/cc |
| Protein content (by analysis) | 48.2% |

| | |
|---|---|
| PDI | 27.4 |
| Total dietary fiber (by analysis) | 5.6% |
| Moisture content (by analysis) | 6.6% |

Extrudate pieces leaving the extruder-drying oven had a smooth glassy surface appearance and were slightly lower in density (0.13 gms/cc) and closer than the pieces in Example 5 to 0.12 gms/cc, the loose pack bulk density of CHEERIOS®. Although the pieces were light in color and had texture/mouth feed characteristics more like conventional low protein cereals, the pieces were too friable and had a high percentage (20%) breakage during transport to and from and through the reel oven.

Surprisingly we were able to change the ratio of SOYFUL™ III soy protein concentrate/soy protein isolate from 2:1 in Example 5 to 1:2 in Example 6 increasing the protein content to 60% and still produce an acceptable product using tapioca starch.

EXAMPLE 7

Example 7 was an attempt to produce a 60% protein content product with the use of a non-tuber starch. A dry blend consisting of 23% rice flour, 31% soy protein isolate, 31% whey protein concentrate and 15% of SOYFUL™ III protein concentrate targeting a final product protein content of 60% was fed along with a controlled rate of ambient water to the pre-condition section of the Wenger twin screw extruder described in Example 4. The moisture content of the blend entering the extruder was about 14%. The same operating conditions as used in Example 4 were initially used in this example. However, after 45 minutes of operation it was apparent that no adjustment of extruder operating parameters or formula (moisture level) would generate acceptable extrudate at the die face. The run was aborted.

EXAMPLE 8

In this example, a highly functional dairy based protein was introduced into the initial blend. A dry blend consisting of 20% tapioca starch, 32% soy protein isolate (90% protein content), 33% whey protein concentrate (80% protein content) and 15% SOYFUL III protein concentrate targeting a final product protein content of 62% was fed along with a controlled rate of ambient tap water to the pre-conditioning mixing section of the Wenger extruder described in Example 4. The PDI of the initial blend was 78.72. The moisture content of the feed entering the extruder was approximately 14.6%. The operating conditions used in Example 4 were repeated and were adjusted slightly to the conditions set forth below:

| | |
|---|---|
| Moisture feed rate | 0.66 lbs./min. |
| Dry blend feed rate | 6.72 lbs./min. |
| Moisture content of blend | 14.6% |
| Extruder screw speed | 497 rpm |
| Extruder screw motor torque | 50% |
| Extrudate barrel temperature | 324° F. |
| Pressure at die | 845 psig |
| Cutter speed | 2705 rpm |
| Extrudate output | 449 lbs./hr. |
| Moisture of extrudate exiting extruder | 21.2% |

The total run time was approximately 3 hours. Extruded pieces were dried continuously in the Wenger forced air reel type oven described in Example 4. The pieces were dried to a final moisture content of 5.3%. The chemical and physical characteristics of the extruded dried pieces were as follows:

| | |
|---|---|
| Loose pack bulk density | 0.18 gms./cc |
| PDI | 31.93 |

Bulk quantities of the product were held overnight for enrobing trials. The extruded pieces were passed through an enrober/coating applicator Wenger Model 4x15 where liquid sweetener-concentrated sucrose syrups (60% solids) mixed with strawberry flavor and antioxidants were continuously applied and fixed to the extruded pieces by heat. The through put rates through the enrober were in the range of 250–350 lbs./hr and the pieces were coated at a 12% dry coating weight. The extruded pieces were found to be suitably durable for processing through an enrober such that palatability of the extruded pieces was improved by addition of a sweetener and flavor. The chemical and physical characteristics of the extruded dried and coated pieces were as follows:

| | |
|---|---|
| Loose pack bulk density | 0.26 gms/cc |
| Protein content (by analysis) | 59.1% |
| Total dietary fiber (by analysis) | 3.4% |
| Moisture content (by analysis) | 1.14% |
| Fat content (by analysis) | 3.6% |
| Ash content (by analysis) | 4.1% |
| Sugars content (by analysis | 29.7% |

The product produced in this example (before coating) matched the appearance and dry texture/mouth feel of a typical ready to eat expanded breakfast cereal such as CHEERIOS containing 8–12% protein. The loose pack bulk density of the product of this example was higher (0.18 gms/cc) than CHEERIOS (0.12 gms/cc) which offers an unexpected benefit to the consumer. More cereal (at least 50% more) can be placed in a typical cereal bowl without aesthetically overpowering the consumer while providing 5 to 6 times more protein.

The inclusion of 15% SOYFUL™ III soy protein concentrate which contains up to 22.4% dietary fiber adds to the nutritional benefit of this product, more than 3% in the final product.

After coating with sugar, flavors and antioxidants, the density of the final product increased from 0.18 to 0.26 gms/cc. Further, the finished product is endowed with more palatability and extended shelf life with the applied coating.

A nutritional analysis and serving comparison of the product of this example with CHEERIOS is shown below.

| A. Coated Dry Cereal | | | |
|---|---|---|---|
| Item | Cereal of this Example | Typical Expanded Cereal* | Cereal of the Example*** |
| Serving Size (gms) | 86** | 17** | 17 |
| Fat (gms) | 3 | 1 | <1 |
| Total Carbohydrate (gms) | 29 | 13 | 6 |
| Dietary Fiber (gms) | 3 | 1 | 1 |

-continued

A. Coated Dry Cereal

| Item | Cereal of this Example | Typical Expanded Cereal* | Cereal of the Example*** |
|---|---|---|---|
| Sugar (gms) | 8 | 1 | 2 |
| Protein | 52 | 2 | 10 |
| Calories | 322 | 62 | 66 |

*CHEERIOS ®
**86 gms of the cereal of this example will fit in a typical breakfast cereal bowl
***same weight (gms) comparison between cereal of this invention and CHEERIOS ®

B. Coated Dry Cereal with 2% Fluid Milk

| Item | Protein Cereal of this Example | One Cup of Milk | Total |
|---|---|---|---|
| Serving Size | 86 | 236 mls | |
| Fat (gms) | 3 | 3 | 6 |
| Total Carbohydrate (gms) | 29 | 11 | 40 |
| Dietary Fiber (gms) | 3 | 0 | 3 |
| Sugar (gms) | 8 | 11 | 19 |
| Protein (gms) | 52 | 8 | 60* |
| Calories | 322 | 100 | 422 |

*Minimum daily requirement of protein for adult male; Whitney, E. and Rolfes, S., understanding nutrition (1993), 6th Ed., West Publishing Co., New York, pg. 312

The loose pack bulk density of approximately 0.26 gms/cc enables the consumer to place 80 to 90 grams of the product of this example into a conventional cereal bowl and to add one cup (240 cc/8 fl. oz.) of 2% milk. When consumed, the combination of the milk and the product of this example satisfies the minimum daily requirement for protein intake for adult males 15 to 50 years of age.

The product of this example was evaluated using an informal taste panel of six people. Eight-six grams of cereal pieces were placed in conventional cereal bowls with one cup of (40–50° F.) 2% milk with the contents of the bowl stirred slightly. The informal taste panel sampled the bowl contents initially and at 5, 10 and 20 minute intervals. The panel rated the product as acceptable or unacceptable with regard to palatability-texture/flavor and aftertaste/mouth feel during mastication. The product received favorable ratings by the panel at all intervals of sampling.

EXAMPLE 9

A dry blend (3000 pounds) consisting of 23% tapioca starch, 27% soy protein isolate (80% protein content), 33% whey protein isolate (90% protein content), and 17% SOY-FUL™ III soy protein concentrate obtained from Zumbro, Inc., Hayfield, Minn., was prepared using a ribbon blender targeting a protein content of 60%. The PDI of the initial blend was 57.94. The dry blend was fed along with ambient tap water to the same extruder used in Example 4. The goal of this example was to evaluate different cereal shapes including "O"s, "crosses", "X"s, and honeycomb in order to establish single formula durability in manufacturing one or more shapes. Between shaping die changes, optimum extruder operating conditions were reestablished. Typical ranges in conditions were:

| | |
|---|---|
| Moisture feed rate | 0.92 to 1.43 lbs/min |
| Dry blend feed rate | 6.0 to 6.6 lbs/min |
| Moisture content of the blend | 21.5 to 26.4% |
| Extruder screw speed | 500 to 510 rpms |
| Extruder screw/motor torque | 49 to 62% |
| Extruder barrel temperature | 185 to 204° F. |
| Pressure at the die | 296 to 1041 psig |
| Speed of extrudate cutter | 1469 to 3260 rpms |
| Extruder output | 394 to 440 lbs/hr |
| Moisture of extrudate leaving the extruder | 18.8 to 24.4% |

Extruder pieces were dried in a continuous, forced air reel oven to final moisture contents shown below:

| | Shape | | | |
|---|---|---|---|---|
| Measurement | "O"s | Crosses | "X"s | Comb Honey |
| Moisture Content (%) | 4.8 | 4.0 | 3.4 | 2.2 |
| Bulk Density (gms/cc) | 0.20 | 0.26 | 0.25 | 0.26 |

Dry pieces "O"s had the following final chemical and physical characteristics:

| | |
|---|---|
| Protein content (by analysis) | 58.8% |
| PDI | 25.68 |
| Total dietary fiber (by analysis) | 4.2% |
| Moisture content (by analysis) | 4.6% |

Although the color and flavor palatability of the crosses, "X"s, and honeycomb shapes matched that of the "O"s, the texture in and out of milk was harder which is reflected somewhat in higher density values. Although the product shaped in crosses, "X"s and honeycomb was satisfactory, the bulk density values of the crosses, "X"s, and honeycomb shapes were too high and not compatible with desired consumer box net weight and target price/value. Further, the higher density did not permit adding on more weight through a coating. For example, the "O"s from this run were coated with a 12% (dry weight basis) blend of sugar, flavors, vitamin/minerals and antioxidant. The final coated "O" product had a finished loose pack bulk density of 0.26 gms/cc which met the target consumer box net weight and price/value.

EXAMPLE 10

A dry blend consisting of 20% potato starch, 33% soy protein isolate, 32% whey protein isolate, and 15% SOY-FUL™ III soy protein concentrate obtained from Zumbro, Inc. of Hayfield, Minn., was prepared using a ribbon blender targeting a protein content of greater than 60%. The PDI of the initial blend was 61.17. As in Example 9, a less functional soy protein isolate than the protein isolate of Example 8 was used. The dry blend was fed along with ambient tap water into the same extruder used in Example 4.

Extruder operating conditions were adjusted to produce an expanded product in the shape of an "O". The goal was to match or improve on the chemical and physical characteristics of Example 8, which contained tapioca starch. At steady state, the extruder operating conditions were as follows:

| | |
|---|---|
| Moisture feed rate | 0.95 lbs/min |
| Dry blend | 6.0 lbs/min |
| Moisture content of the blend | 23.1% |
| Extruder screw speed | 500 rpms |
| Extruder screw/motor torque | 54% |
| Extruder barrel temperature | 212° F. |
| Pressure at the die | 1122 psig |
| Speed of extrudate cutter | 3200 rpms |
| Extruder output | 429 lbs/hr |
| Moisture of extrudate leaving the extruder | 18.8% |

Extruded pieces were dried in a continuous forced air reel oven to a final moisture content of 1.7%.

The dried pieces had the following final chemical and physical characteristics:

| | |
|---|---|
| Loose pack bulk density | 0.24 gms/cc |
| Protein content (by analysis) | 62.5% |
| PDI | 26.86 |
| Total dietary fiber (by analysis) | 3.3% |
| Moisture content (by analysis) | 6.5% |

The finished product had excellent mouth feel characteristics in and out of milk with a bland flavor which offers great flexibility for subsequent addition of flavor choices. In addition to demonstrating that potato starch can replace tapioca starch in the formula, this example demonstrated that a whey protein isolate could replace the whey protein concentrate as the dairy protein choice. The presence of calcium phosphate in the soy protein isolate used (calcium 3% phosphorus 2.1%) also demonstrates that minerals (inorganic salts) can be included in the extrudate.

EXAMPLE 11

A dry blend consisting of 17% tapioca starch, 13% soy protein isolate, 60% whey protein isolate and 10% SOYFUL™ III soy protein concentrate obtained from Zumbro, Inc., of Hayfield, Minn., was prepared using a ribbon blender targeting a protein content of greater than 70%. The PDI of the initial blend was 68.28. The dry blend was fed along with ambient tap water into the same extruder used in Example 4. Extruder conditions were adjusted to produce an expanded product in the shape of an "O". The goal was to raise the protein level to 70% to determine if an acceptable product could be produced. At steady state, the extruder operating conditions were as follows:

| | |
|---|---|
| Moisture feed rate | 0.95 lbs/min |
| Dry blend feed rate | 4.92 lbs/min |
| Moisture content of the blend | 25.5% |
| Extruder screw speed | 500 rpms |
| Extruder screw/motor torque | 71% |
| Extruder barrel temperature | 185° F. |
| Pressure at the die | 1063 psig |
| Speed of extrudate cutter | 3200 rpms |
| Extruder output | 357 lbs/hr |
| Moisture of extrudate leaving the extruder | 29.3% |

Extruder pieces were dried in a continuous forced air reel oven to final moisture content of 4.4%.

The dried pieces had the following chemical and physical characteristics:

| | |
|---|---|
| Loose pack bulk density | 0.22 gms/cc |
| Protein content (by analysis) | 70.3% |
| PDI | 24.26 |
| Total dietary fiber (by analysis) | 3.9% |
| Moisture content (by analysis) | 2.8% |

The extrudate leaving the extruder had surprisingly good expansion characteristics showing a loose pack bulk density value close to that of Example 11 (0.21 gms/cc) which had significantly lower 50% protein content. The friability of this product was evident during the post extrusion handling of the pieces to and through the continuous dryer breakdown of the "O"s was evident. In and out of the milk this product maintained a crisp texture with a slight bitter after taste (attributable to the high level of dairy protein) during mastication. More noticeable was the dominance of a mealy almost slimy mouth feel after taste this product left after mastication. This product lacked the clean non-residual mouth feel of breakfast cereals. Clearly the presence of SOYFUL™ III is important in achieving a desirable mouth feel as shown in earlier examples; in this product the high level of dairy protein whey protein isolate masked the physical presence and functionality of SOYFUL™ III.

Although the present invention has been described with reference to preferred embodiments, workers skilled in the art will recognize that changes may be made in form and detail without departing from the spirit and scope of the invention.

What is claimed is:

1. An extrusion expanded cereal-type product having a protein content of at least approximately 60 wt. % and a starch component derived from a tuber.

2. The cereal-type product of claim 1 wherein the loose pack bulk density is in the approximate range of 0.13–0.38 gms/cc.

3. The product of claim 1 wherein the tuber is cassava or potato.

4. The product of claim 1 wherein the starch is tapioca or potato.

5. An expanded cereal-type product comprising a cooked product derived from a mix containing at least approximately 60 wt. % protein and approximately 5–30 wt. % starch derived from a tuber.

6. The product of claim 5 wherein the tuber is manihot esculenta.

7. The product of claim 5 wherein the tuber is potato.

8. The product of claim 5 wherein the starch is tapioca.

9. The product of claim 5 wherein the protein is derived from dairy source or soy beans or a combination of both.

10. The product of claim 5 wherein the protein from the dairy source exceeds the protein from the starch.

11. An expanded cereal-type product comprising:
a cooked product produced from a mix including starch derived from a tuber and protein derived from a whey or soy beans or both in combination, having a total protein content of at least approximately 60 wt. %.

12. The cereal-type product of claim 11 wherein the tuber starch is tapioca or potato.

13. A method for preparing an expanded cereal-type product having a high protein content, the method comprising:
forming a homogenous dry mix having at least approximately 60 wt. % and a tuber starch in an amount effective to expand the mix upon exiting from an extruder;

adding water to the mix in an amount sufficient to hydrate the tuber starch;

processing the mixture through a high temperature high pressure extruder; and forming by expansion the cooked cereal-type dough extrudate into sized shapes or pieces.

14. The method of claim 13 and further including the step of drying the sized shapes or pieces.

15. The method of claim 14 and further including coating the dried shapes or pieces with a sweetener or flavor or both.

16. The method of claim 14 and further including coating the dried shapes or pieces with antioxidants, vitamins or minerals or a combination thereof.

17. The method of claim 13 wherein minerals, vitamins, flavoring agents, or fiber or a combination thereof are added to the mixture.

18. The method of claim 13 wherein at least approximately 5 wt. % of the dry mixture is the tuber starch.

19. The method of claim 13 wherein the tuber is Manihot esculenta or potato.

20. The method of claim 13 wherein the tuber starch is tapioca.

21. The method of claim 13 wherein up to 50% of the mixture is a denatured protein source.

22. The method of claim 14 wherein the protein includes denatured and functional protein and the amount of functional to denatured protein is adjusted to produce selected textured characteristics or to increase durability of the dried shapes or pieces or both.

23. The cereal type product in claim 1 wherein protein content of the product when combined with milk provides up to the minium daily requirement of protein for a male adult in a single serving.

* * * * *